(12) United States Patent
Engel et al.

(10) Patent No.: US 12,013,271 B2
(45) Date of Patent: Jun. 18, 2024

(54) EVALUATION OF FLOW PROPERTIES IN PHYSICAL MEDIA

(71) Applicant: International Business Machines Corporation, Armonk, NY (US)

(72) Inventors: Michael Engel, Rio de Janeiro (BR); Rodrigo Neumann Barros Ferreira, Rio de Janeiro (BR); Mathias B. Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 16/938,471

(22) Filed: Jul. 24, 2020

(65) Prior Publication Data
US 2022/0026253 A1 Jan. 27, 2022

(51) Int. Cl.
*G01F 1/708* (2022.01)
*G01F 1/7086* (2022.01)
*G01F 1/74* (2006.01)
*G01P 5/20* (2006.01)

(52) U.S. Cl.
CPC .............. *G01F 1/7086* (2013.01); *G01F 1/74* (2013.01); *G01P 5/20* (2013.01)

(58) Field of Classification Search
CPC ........ G01F 1/7086; G01F 1/74; G01F 15/063; G01F 1/712; G01P 5/20
USPC ........................................................ 356/28
See application file for complete search history.

(56) References Cited

U.S. PATENT DOCUMENTS

| | | |
|---|---|---|
| 6,731,387 B2 | 5/2004 | Neimark et al. |
| 7,033,910 B2 | 4/2006 | Faris |
| 7,780,912 B2 | 8/2010 | Farmer et al. |
| 8,143,063 B2 | 3/2012 | Farmer et al. |
| 8,220,494 B2 | 7/2012 | Studer et al. |
| 8,270,781 B2 | 9/2012 | Lo et al. |
| 8,409,524 B2 | 4/2013 | Farmer et al. |
| 8,926,906 B2 | 1/2015 | Packirisamy et al. |

(Continued)

FOREIGN PATENT DOCUMENTS

| | | |
|---|---|---|
| CN | 103472256 A | 12/2013 |
| CN | 203705468 U | 7/2014 |

(Continued)

OTHER PUBLICATIONS

Pct, Notification of Transmittal of The International Search Report and The Written Opinion of The International Searching Authority, or The Declaration for Application PCT/CN2021/108160 dated Oct. 26, 2021, pp. 1-10.

(Continued)

*Primary Examiner* — Daniel L Murphy
(74) *Attorney, Agent, or Firm* — Patterson + Sheridan, LLP (57) ABSTRACT

Techniques for determining flow properties of a fluid in a fluidic device comprising a light source configured to generate a plurality of optical signals, tracers suspended in a fluid, a plurality of photonic devices, each including a photonic element and flow channel, and a measurement device configured to: determine a first measurement based on the plurality of optical signals and the tracers in a flow channel of a first photonic device of the plurality of photonic devices, determine a second measurement based on the plurality of optical signals and the tracers in a flow channel of a second photonic device of the plurality of photonic devices, and determine a property associated with a flow of the fluid or the tracers based on the first measurement and the second measurement.

20 Claims, 4 Drawing Sheets

(56) References Cited

U.S. PATENT DOCUMENTS

| | | |
|---|---|---|
| 9,891,166 B2 | 2/2018 | Wild et al. |
| 2007/0048866 A1 | 3/2007 | Farmer et al. |
| 2011/0008896 A1 | 1/2011 | Farmer et al. |
| 2012/0135528 A1 | 5/2012 | Farmer et al. |
| 2014/0110105 A1 | 4/2014 | Jones et al. |
| 2019/0090791 A1 | 3/2019 | Siu et al. |
| 2022/0026253 A1 | 1/2022 | Engel et al. |

FOREIGN PATENT DOCUMENTS

| | | |
|---|---|---|
| CN | 103472256 B | 9/2015 |
| CN | 205210100 U | 5/2016 |
| CN | 106908622 A | 6/2017 |
| CN | 106908622 B | 5/2019 |
| CN | 111007278 A | 4/2020 |
| CN | 111094937 A | 5/2020 |
| DE | 112018005501 T5 | 7/2020 |
| GB | 2581275 A | 8/2020 |
| JP | 2003285298 A | 10/2003 |
| JP | 2020535394 A | 12/2020 |
| WO | 2013106480 A1 | 7/2013 |
| WO | 2017040856 A1 | 3/2017 |
| WO | 2019064094 A1 | 4/2019 |

OTHER PUBLICATIONS

Godin et al., "Microfluidics and photonics for Bio-System-on-a-Chip: A review of advancements in technology towards a microfluidic flow cytometry chip", National Institutes of Health, Oct. 2008.

Fan, et al. "Low-Cost PMMA-based Micorfluidics for the Visualization of Enhanced Oil Recovery", Oil & Gas Science and Technology, 2018.

CMC Microsystems Impact "Photonic Sensor for Increased Efficiency in Oil Extraction", Nov. 2014.

Australian Government, Examination Report No. 1 for Standard Patent Application for Application 2021312206 dated Oct. 31, 2023.

EVALUATION OF FLOW PROPERTIES IN PHYSICAL MEDIA

BACKGROUND

Traditional processes for determining flow properties of fluids in constricted channels typically involve visual measurements of particles suspended in the fluids. Often, constricted channels of interest are opaque (or otherwise obscured) such that visual-based measurement processes are ineffective to determine flow properties in the channels.

Such processes can also require specialized equipment, such as transparent viewing panes and elaborate microscope systems, to visually inspect the flow of the particles. Hence, these processes for determining the flow properties of fluids can be unnecessarily costly.

Further, the traditional processes typically involve serial measurements of the particles. Hence, these processes can have relatively slow performance due to slow data aggregation when inspecting the particles as they flow in the constricted channels.

SUMMARY

A system is provided according to one embodiment of the present disclosure. The system comprises a light source configured to generate a plurality of optical signals; tracers suspended in a fluid; a plurality of photonic devices, each including a photonic element and flow channel; and a measurement device configured to: determine a first measurement based on the plurality of optical signals and the tracers in a flow channel of a first photonic device of the plurality of photonic devices, determine a second measurement based on the plurality of optical signals and the tracers in a flow channel of a second photonic device of the plurality of photonic devices, and determine a property associated with a flow of the fluid or the tracers based on the first measurement and the second measurement. Advantageously, this enables the flow properties of a channel to be determined irrespective of the opaqueness or visual obscurity of the channel. Further, this lowers the cost of determining flow property of fluids in such channels since the determinations do not depend on specialized equipment such as transparent walls and elaborate microscope systems for visual inspection.

According to another embodiment of the present disclosure, a photonic element of the first photonic device is aligned with the light source to allow the plurality of optical signals to reach the flow channel of the first photonic device. Advantageously, this enables the system to measure and determine the flow of the tracers without relying on visual inspection.

According to another embodiment of the present disclosure, a first photonic element of the first photonic device and a second photonic element of the first photonic device are aligned on opposite sides of the flow channel of the first photonic device such that the plurality of optical signals can transfer from the first photonic element to the second photonic element. Advantageously, this enables the system to measure the interaction between the light signal and the tracers so that the flow properties of the fluid can be determined.

According to another embodiment of the present disclosure, the photonic element of the first photonic device comprises a Y-splitter, wherein the light source is disposed on a first end of the Y-splitter, wherein the measurement device is disposed on a second end of the Y-splitter, and wherein a third end of the Y-splitter is disposed on the flow channel of the first photonic device. Advantageously, this enables the system to measure the interaction between the light signal and the tracers so that the flow properties of the fluid can be determined.

According to another embodiment of the present disclosure, the flow channel of the first photonic device extends from one end of a first photonic device to the opposite end of the first photonic device. Advantageously, this enables the fluid to flow through the first silicon-based photonic device, such that the flow of the fluid in the flow channel represents the flow of the fluid in the fluidic device. This enables measurements taken at the flow channel to accurately represent the flow of the fluid in the fluidic device.

According to another embodiment of the present disclosure, each of the first measurement and the second measurement comprises at least one of a fluorescence, reflection, a refraction, an absorption, or an emission of light. Advantageously, this enables the system to measure the effects of the interaction between the light signal and the tracers.

According to another embodiment of the present disclosure, one or more photonic devices are disposed on the first photonic device. Advantageously, this enables the system to take parallel measurements of the fluid or particles, thereby increasing the speed of data aggregation, and the speed of the determination of the fluid's properties.

According to another embodiment of the present disclosure, the tracers comprise at least one of polystyrene balls containing fluorescent molecules, inorganic particles, quantum dots, molecules, organic dye, metal micro-particles, or metal nanoparticles. Advantageously, this enables the system to measure how the light signal interacts with, and affects, the tracers, thereby enabling functional measurements to determine properties of the fluid.

A photonic device is presented according to one embodiment of the present disclosure. The photonic device comprises: a substrate; a first photonic element disposed on the substrate; a flow channel disposed on the substrate, wherein the first photonic element is arranged to allow an optical signal to reach the flow channel from outside of the photonic device; and a capping layer disposed on the first photonic element and the flow channel. Advantageously, this enables the measurement of fluids that flow through the flow channel, thereby enabling determination of the fluid's properties.

According to another embodiment of the present disclosure, the flow channel is arranged to allow fluid to flow to a second photonic device. Advantageously, this enables flow properties to be determined based on measurements at each photonic device, thereby enabling the determination of flow properties of a fluid that flows between the photonic device and the second photonic device.

According to another embodiment of the present disclosure, the first photonic element and a second photonic element are aligned on opposite sides of the flow channel such that the optical signal can transfer from the first photonic element to the second photonic element. Advantageously, this enables the system to measure the interaction between the light signal and the tracers so that the flow properties of the fluid can be determined.

According to another embodiment of the present disclosure, the first photonic element comprises a Y-splitter, wherein a first end of the Y-splitter extends to a first side of the photonic device, wherein a second end of the Y-splitter extends to the first side of the photonic device, and wherein a third end of the Y-splitter is disposed on the flow channel. Advantageously, this enables the system to measure the interaction between the light signal and the tracers so that the flow properties of the fluid can be determined.

According to another embodiment of the present disclosure, the photonic device is disposed on at least one other photonic device. Advantageously, this enables the system to take parallel measurements of the fluid or particles, thereby increasing the speed of data aggregation, and the speed of the determination of the fluid's properties.

A method is provided according to one embodiment of the present disclosure. The method comprises: determining, via a measurement device, a first measurement based on a plurality of optical signals and a flow of tracers in a flow channel of a first photonic device; determining, via the measurement device, a second measurement based on the plurality of optical signals and the flow of the tracers in a flow channel of a second photonic device, wherein the first and second flow channels are fluidically connected; and determining, via the measurement device, a property associated with the flow of the tracers based on the first measurement and the second measurement. Advantageously, this enables the flow properties of a channel to be determined irrespective of the opaqueness or visual obscurity of the channel. Further, this lowers the cost of determining flow property of fluids in such channels since the determinations do not depend on specialized equipment such as transparent walls and elaborate microscope systems for visual inspection.

According to another embodiment of the present disclosure, determining the flow property further comprises determining a macroscopic flow speed (U) of a fluid that includes the tracers. Advantageously, this enables determination of flow properties in particular channels of the fluidic device.

According to another embodiment of the present disclosure, the macroscopic flow speed (U) is determined as a function of a flow rate (Q) of the fluid over a cross-sectional area (A) of the fluidic device, wherein Q is due to an applied pressure gradient ($\nabla P$), such that $U=Q/A$. Advantageously, this enables determination of flow properties in particular channels of the fluidic device.

According to another embodiment of the present disclosure, the macroscopic flow speed (U) is determined as a function of a distance traveled ($\Delta x$) by the plurality of tracers and an average time ($\langle \Delta t \rangle$) required to travel the distance $\Delta x$, wherein the macroscopic flow speed (U) is determined as a function of a channel length (L) traveled by the plurality of tracers and an average time of flight ($\langle T_F \rangle$) required to travel the length L, such that $U=Q/A=\Delta x/\langle \Delta t \rangle =L/\langle T_F \rangle$. Advantageously, this enables determination of flow properties in particular channels of the fluidic device.

According to another embodiment of the present disclosure, determining the flow property further comprises determining a permeability ($\kappa$) of a channel of the fluidic device based on a fluid viscosity ($\mu$), the macroscopic flow speed (U), and a pressure gradient $\nabla P$, such that $\kappa=\mu U/(-\nabla P)$. Advantageously, this enables determination of flow properties in particular channels of the fluidic device.

DETAILED DESCRIPTION

Embodiments of the present disclosure are directed towards a measurement system for determining flow properties of a fluid in a micro-fluidic or nano-fluidic device. As mentioned above, traditional processes for determining flow properties rely on visual inspection of particles in the fluid, which is ineffective for opaque or obscure channels. Further, the traditional processes typically implement costly microscopic systems to perform the visual inspections of particles in the fluid. Further, the traditional processes can have relatively poor performance due to a serialized inspection of the particles in the fluid.

In one embodiment of the present disclosure, the measurement system includes scalable flow units disposed on or within the fluidic device such that the fluid of the fluidic device flows through a flow channel of each scalable flow unit. In one embodiment, each scalable flow unit comprises a photonic element that allows light to reach the flow channels of the scalable flow units. The measurement system tracks tracers suspended in the fluid of the fluidic device as the fluid flows through the flow channels. The measurement system also determines light measurements based on interactions between the tracers and the light that reaches the flow channels. The flow properties of the fluid are determined based on the light measurements.

Benefits of the aforementioned embodiments over traditional processes for determining flow properties include the ability to determine the flow properties of fluids in opaque or obscured channels, decreased costs due to flow property determinations that do not depend on specialized equipment such as transparent walls and elaborate microscope systems for visual inspection, and increased performance due to parallel measurements to gather data about the flow of the fluid.

Figure 1:
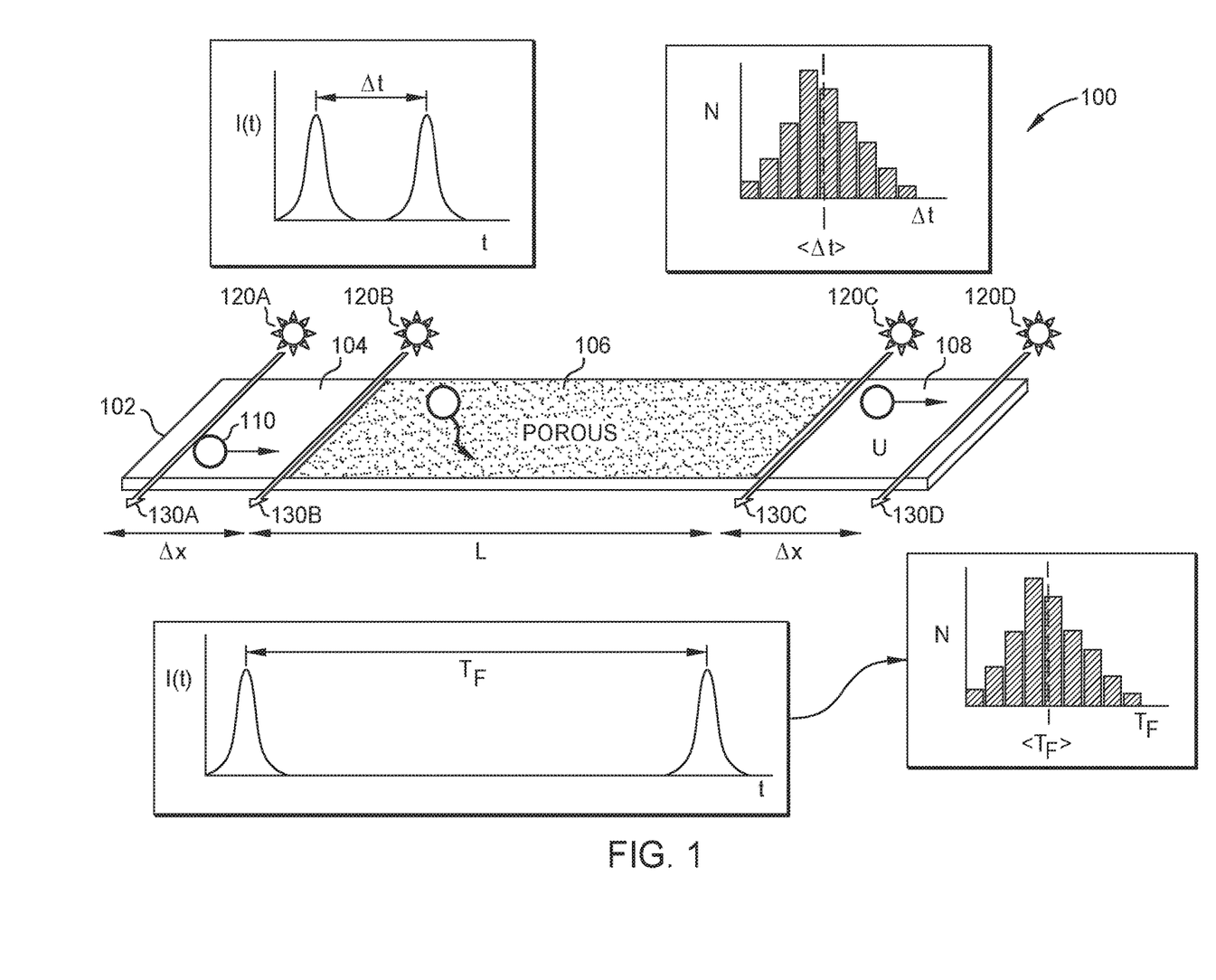
FIG. 1 illustrates a fluidic device measurement system, according to one embodiment.

FIG. 1 illustrates a fluidic device measurement system 100, according to one embodiment. In one embodiment, the fluidic device measurement system 100 comprises a fluidic device 102 that includes a first channel configuration 104, a second channel configuration 106, and a third channel configuration 108.

In the illustrated embodiment, the first channel configuration 104 and the third channel configuration 108 include a smooth surface texture, while the second channel configuration 106 includes a porous channel texture. Due to differences in these channel configurations, flow properties of a fluid may not be identical as the fluid flows from the first channel configuration 104 to the third channel configuration 108. As a non-limiting example, the fluid can flow at a first flow rate through the first channel configuration 104, which can include a smooth surface texture, and can flow at a different, second flow rate through the second channel configuration 106, which can include a porous surface texture.

In one embodiment, one or more scalable flow units (which are discussed in detail later in FIGS. 2A-2B, but are omitted from FIG. 1 so the underlying elements in the fluidic device measurement system 100 can be seen) are disposed on or within the channel configurations of the fluidic device. Each scalable flow unit can comprise one or more photonic elements. The photonic elements can comprise at least one of a waveguide, splitter, combiner, mixer, or interferometer, or the like.

When the photonic elements are aligned with one or more light sources 120A-120D, the photonic elements transfer light from a location external to the scalable flow unit into a flow channel of the scalable flow unit or into a channel configuration of the fluidic device. In the illustrated embodiment, the light sources 120A-120D are depicted as four separate light sources disposed on a first side of the fluidic device 102 (e.g., along a length of the fluidic device 102). However, in one embodiment, the light sources 120A-120D can represent a single light source. For instance, the light sources 120A-120D can be a single fluorescent light source that spans the length of the fluidic device, or a single light source with four outlet light sources.

As shown, one or more measurement devices 130A-130D are disposed on a second side of the fluidic device, opposite the first side. When the measurement devices 130A-130D are aligned with the light sources 120A-120D, light signals from the light sources 120A-120D are transferred from the light sources 120A-120D, through one or more channel configurations of the fluidic device, and to the measurement devices 130A-130D. The measurement devices 130A-130D can be any device, instrument, or sensor system that can detect or measure a light signal. For instance, the measurement devices 130A-130D can be a flow sensor, a photodiode, a photometer, a light meter, a spectrometer, a computing system or micro-controller connected to at least one of the foregoing, or the like.

In one embodiment, the measurement devices 130A-130D include software to communicate measurements to one another, and to calculate flow properties based on the measurements. In another embodiment, the measurement devices 130A-130D are communicatively coupled to a computing system (not shown) that receives the measurements and calculates flow properties of the fluid based on the measurements.

In the illustrated embodiment, the measurement devices 130A-130D are depicted as four separate measurement devices. However, in one embodiment, the measurement devices 130A-130D can indicate a single measurement device, such as a computing system or micro-controller connected to at least one of a flow sensor, a photodiode, a photometer, a light meter, a spectrometer, or the like.

In one embodiment, a set of tracers 110 are suspended in the fluid to aid the fluidic device measurement system 100 in determining the flow properties of the fluid as it passes through each channel configuration. In the illustrated embodiment, the tracers 110 are suspended in the fluid of the fluidic device 102. The tracers 110, along with the fluid, flow through the fluidic device due to a pressure gradient (∇P) applied to the cross-sectional area (A) of the fluidic device. As the fluid flows from the first channel configuration 104 to the third channel configuration 108, the tracers 110 can represent the flow properties of the fluid in each respective channel configuration.

In one embodiment, the tracers 110 suspended in the fluid are limited in amount such that a single tracer interacts with a light signal from one of the light sources 120A-120D at a given moment. One benefit to limiting the amount of tracers 110 in this way is that the measurement device corresponding to the respective light signal can take more accurate measurements of the single tracer, absent interference or obstruction from other tracers.

In one embodiment, the tracers 110 are smaller than at least one dimension of each channel configuration to ensure that the tracers 110 do not obstruct or alternate the flow of the fluid in the fluidic device. The measurement devices 130A-130D can measure the flow properties of a channel configuration both before and after the tracers are suspended in the fluid. The measurement devices 130A-130D can compare the pre-tracer flow properties to the post-tracer flow properties to determine whether the sizes of the tracers 110 have changed the pre-tracer flow properties. In the event that such a change occurs, the oversized tracers can be removed or replaced with an appropriately sized tracer that does not affect the pre-tracer flow properties.

Additional properties of the tracers 110 can correspond to measurement techniques of the fluidic device measurement system 100. For example, fluorescent tracers can be used for measurement devices that implement florescent-based measurement signals. In one embodiment, the tracers comprise polystyrene balls comprising molecules that fluoresce upon excitation by light. Hence, the molecules are selected, designed, or dyed to absorb or reflect light corresponding to a wavelength of the florescent-based measurement signals. The tracers can also comprise inorganic particles, quantum dots, molecules, organic dye, or the like, with or without any polystyrene container.

The tracers can also comprise non-fluorescent matter for use with measurement devices that implement other light-based measurement signals. In one embodiment, the tracers can comprise metal micro-particles, or nanoparticles such as gold nanoparticles or silver nanoparticles.

When the tracers comprise fluorescent matter, the measurement devices 130A-130D can measure the fluorescence of the tracer to determine the flow properties of the fluid in the channel configurations. When the tracers comprise metal particles, the measurement devices 130A-130D can measure the reflection, refraction, or absorption of the light signals to determine the flow properties of the fluid in the channel configurations.

In the illustrated embodiment, as the tracers 110 flow across the first channel configuration 104, the tracers 110 can flow into a flow channel of a first scalable flow unit (not shown). Light source 120A generates a light signal, which is transferred into a photonic element of the first scalable flow unit. The photonic element of the first scalable flow unit can guide the light signal to the flow channel of the first scalable flow unit. The tracers 110 encounter the light signal as the tracers 110 travel along the flow channel of the first scalable flow unit. During this encounter, measurement device 130A can measure a fluorescence of the tracers 110, or an absorption, reflection, or refraction of the light signal. In one embodiment, the measurement device 130A can determine a point in time when it measures a light intensity or a change in light intensity from the tracers 110, and communicate the point in time with a computing system or with another measurement device.

As the tracers 110 continue to flow across the first channel configuration 104, the tracers 110 can flow into a flow channel of a second scalable flow unit (not shown). Light source 120B generates a light signal, which is transferred into a photonic element of the second scalable flow unit. The photonic element of the second scalable flow unit can guide the light signal to the flow channel of the second scalable flow unit. The tracers 110 encounter the light signal as the tracers 110 travel along the flow channel of the second scalable flow unit. During this encounter, measurement device 130B can measure a fluorescence of the tracers 110, or an absorption, reflection, or refraction of the light signal. In one embodiment, the measurement device 130B can determine a point in time when it measures a light intensity or a change in light intensity from the tracers 110, and communicate the point in time with a computing system or with another measurement device.

In one embodiment, a computing system receives the measurements and points in time (e.g., timestamps) from measurement device 130A and measurement device 130B, and determines an average time delay ($<\Delta t_1>$) between the points in time. Hence, $<\Delta t_1>$ can represent the average amount of time the tracers 110 take to travel across the first channel configuration 104. In another embodiment, a combination of the measurement devices 130A-130D can be communicatively coupled to each other and can determine the average time delay corresponding to a channel configuration in the fluidic device 102 using a process similar to the aforementioned computer system process.

In the illustrated embodiment, the computing system receives measurements and points in time that correspond to light intensity from the tracers 110 as they pass measurement devices 130A and measurement device 130B. The computing system can map the measurements and points in time to the light intensity from the tracers 110 as a function of time (I(t)). The computing system can then determine the points in time of peak (or inverted peak) light intensities from the tracers 110, and cross-correlate these points in time to determine a time delay ($\Delta t_1$) between peaks, or inverted peaks, of light intensity from the tracers 110. The computing system can further determine $<\Delta t_1>$ based on the $\Delta t_1$. In another embodiment, a combination of the measurement devices 130A-130D can determine $\Delta t_1$ and $<\Delta t_1>$ using a process similar to the aforementioned computer system process.

In the illustrated embodiment, as the tracers 110 flow across the second channel configuration 106, the tracers 110 can flow into a flow channel of a third scalable flow unit (not shown). As shown, light source 120C generates a light signal, which is transferred into a photonic element of the third scalable flow unit. The photonic element of the third scalable flow unit can guide the light signal to the flow channel of the third scalable flow unit. The tracers 110 encounter the light signal as the tracers 110 travel along the flow channel of the third scalable flow unit. During this encounter, measurement device 130C can measure a fluorescence of the tracers 110, or an absorption, reflection, or refraction of the light signal. In one embodiment, the measurement device 130C can determine a point in time when it measures a light intensity or a change in light intensity from the tracers 110, and communicate the point in time with a computing system or with another measurement device.

In one embodiment, the computing system receives the measurements and points in time from measurement device 130B and measurement device 130C, and determines an average time of flight ($<T_F>$) between the points in time. Hence, $<T_F>$ can represent the average amount of time the tracers 110 take to travel across the second channel configuration 106. In another embodiment, a combination of the measurement devices 130A-130D can be communicatively coupled to each other and can determine $<T_F>$ using a process similar to the aforementioned computer process.

In the illustrated embodiment, the computing system receives measurements and points in time that correspond to light intensity from the tracers 110 as they pass measurement devices 130B and measurement device 130C. The computing system can map the measurements and points in time to the light intensity from the tracers 110 as a function of time (I(t)). The computing system can then determine the points in time of peak (or inverted peak) light intensities from the tracers 110, and cross-correlate these points in time to determine a time of flight ($T_F$) of the tracers 110 as the time delay between peaks, or inverted peaks, of light intensity from the tracers 110. The computing system can further determine $<T_F>$ based on $T_F$. In another embodiment, a combination of the measurement devices 130A-130D can determine $T_F$ and $<T_F>$ using a process similar to the aforementioned computer system process.

In the illustrated embodiment, as the tracers 110 flow across the third channel configuration 108, the tracers 110 can flow into a flow channel of a fourth scalable flow unit (not shown). As shown, light source 120D generates a light signal, which is transferred into a photonic element of the fourth scalable flow unit. The photonic element of the fourth scalable flow unit can guide the light signal to the flow channel of the fourth scalable flow unit. The tracers 110 encounter the light signal as the tracers 110 travel along the flow channel of the fourth scalable flow unit. During this encounter, measurement device 130D can measure a fluorescence of the tracers 110, or an absorption, reflection, or refraction of the light signal. In one embodiment, the measurement device 130D can determine a point in time when it measures a light intensity or a change in light intensity from the tracers 110, and communicate the point in time with a computing system or with another measurement device.

In one embodiment, the computing system receives the measurements and points in time from measurement device 130C and measurement device 130D, and determines an average time delay ($<\Delta t_2>$) between the points in time. Hence, $<\Delta t_2>$ can represent the average amount of time the tracers 110 take to travel across the third channel configuration 108. In another embodiment, the measurement devices 130A-130D can be communicatively coupled to each other and can determine $\Delta t$ using a process similar to the aforementioned computer process.

In the illustrated embodiment, the computing system receives measurements and points in time that correspond to light intensity from the tracers 110 as they pass measurement devices 130C and measurement device 130D. The computing system can map the measurements and points in time to the light intensity from the tracers 110 as a function of time (I(t)). The computing system can then determine the points in time of peak (or inverted peak) light intensities from the tracers 110, and cross-correlate these points in time to determine a time delay ($\Delta t_2$) between peaks, or inverted peaks, of light intensity from the tracers 110. The computing system can further determine $<\Delta t_2>$ based on $\Delta t_2$. In another embodiment, a combination of the measurement devices 130A-130D can determine $\Delta t_2$ and $<\Delta t_2>$ using a process similar to the aforementioned computer system process.

In the illustrated embodiment, at least one dimension of the first channel configuration 104 and the third channel configuration 108 are equal in length. This length, traveled by the tracers 110, is labeled as $\Delta x$. The length of a dimension of the second channel configuration 106 that is traveled by the tracers 110 is labeled as L. The flow rate (Q) of the fluid over the cross-sectional area (A) of the fluidic device is due to the applied pressure gradient ($\nabla P$). Given the aforementioned information, measurements, points in time, $<\Delta t_1>$, $<\Delta t_2>$, and $<T_F>$, the macroscopic flow speed (U) of the fluid in the fluidic device can be determined as follows:

$$U = Q/A = \Delta x / \langle \Delta t_1 \rangle = \Delta x / \langle \Delta t_2 \rangle = L / \langle T_F \rangle$$

Additional flow properties can be determined given a measured or observed viscosity of the fluid ($\mu$), macroscopic flow speed (U), and the pressure gradient $\nabla P$ applied to the cross-sectional area (A) of the fluidic device. Given the aforementioned elements, the permeability (κ) of the porous material in the second channel configuration 106 can be determined as follows:

$$\kappa = \mu U/(-\nabla P)$$

One benefit to the aforementioned process for determining the flow properties of the fluid is that the flow properties do not need to be measured inside of a given channel configuration. Hence, the flow properties can be determined when a channel configuration is opaque (or otherwise obscured) such that visual-based measurement techniques to determine flow properties in the channel configuration are ineffective.

Figure 2A:
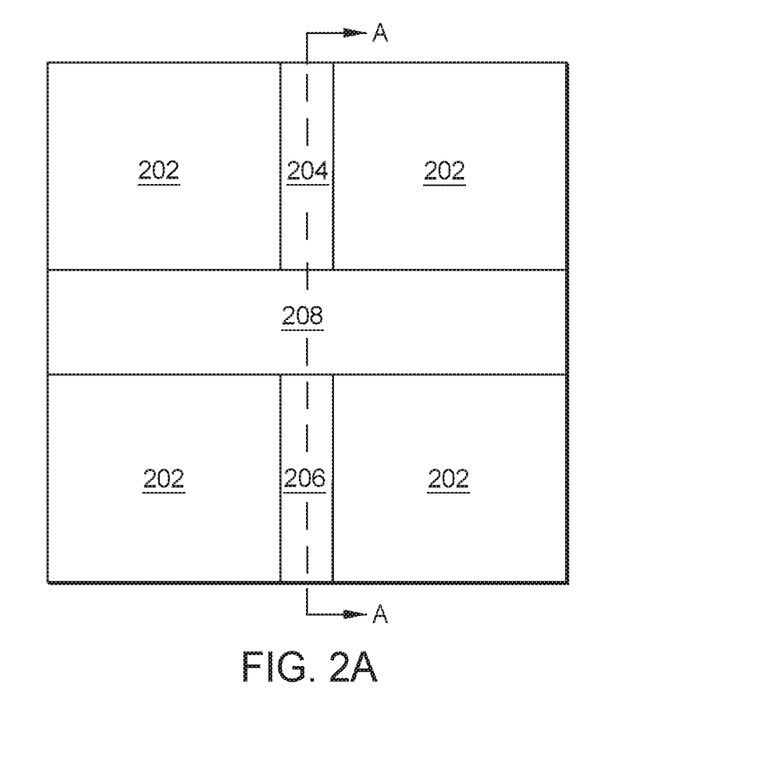
FIG. 2A illustrates a top view of a scalable flow unit, according to one embodiment.
Figure 2B:
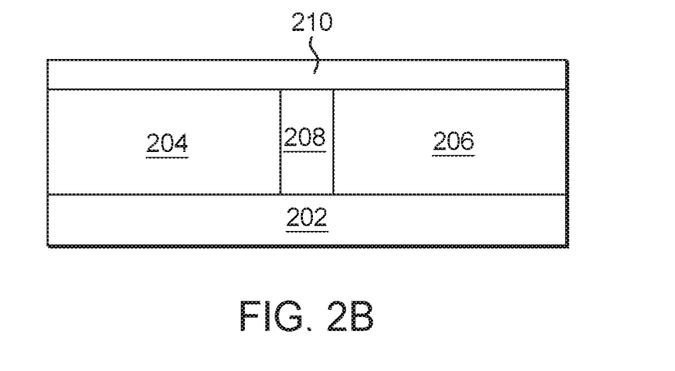
FIG. 2B illustrates a cross-sectional view of a scalable flow unit, according to one embodiment.

FIGS. 2A and 2B illustrate a scalable flow unit 200, according to one embodiment. FIG. 2A illustrates a top view of the scalable flow unit 200.

In the illustrated embodiment, a first photonic element 204, a second photonic element 206, and a flow channel 208 are disposed on a first silicon-based layer 202. A second silicon-based layer (which is omitted from FIG. 2A so the underlying elements in the scalable flow unit 200 can be seen) is disposed on the first photonic element 204, the second photonic element 206, and the flow channel 208. Further, FIG. 2A includes the cross section A-A indicating the cross sectional view illustrated in FIG. 2B.

Further, as shown, the first photonic element 204 is arranged orthogonal to the first side of the flow channel 208, and the second photonic element 206 is arranged orthogonal to the second side of the flow channel 208. The first photonic element 204 and the second photonic element 206 are aligned such that an optical signal from a light source positioned outside of the scalable flow unit 200 can enter into a first end of the first photonic element 204, and transfer through a second end of the first photonic element 204 that is disposed on the first side of the flow channel 208.

In one embodiment, scalable flow unit 200 is disposed on or within a fluidic device such that the fluid from the fluidic device flows through the flow channel 208. The fluid can flow in a direction that is parallel to the first and second sides of the flow channel 208, or orthogonal to the first photonic element 204 and the second photonic element 206. The fluid can include tracers that are small enough to travel through the flow channel without altering or obstructing the flow of the fluid in the flow channel or in the fluidic device.

In the illustrated embodiment, the optical signal can transfer from the first side of the flow channel 208 to the second side of the flow channel 208, and encounter the tracers in the flow channel 208. During this encounter, the optical signal may be partially absorbed, reflected, or refracted by the tracers. The optical signal may also trigger a fluorescent effect in the tracers. The optical signal can then transfer into the first side of the second photonic element 206 that is disposed on the second side of the flow channel 208, and exit from a second side of the second photonic element 206.

FIG. 2B illustrates a cross-sectional view of the scalable flow unit 200. In the illustrated embodiment, the scalable flow unit 200 comprises the first silicon-based layer 202. In one embodiment, the first silicon-based layer 202 functions as a substrate. The first silicon-based layer 202 can comprise silicon oxide, silicon nitrite, or any other silicon-based insulator.

The flow channel 208 is disposed on the first silicon-based layer 202. The first and second photonic elements 204 and 206 are disposed on the first silicon-based layer 202. As shown, the first photonic element 204 is disposed on a first side of the flow channel 208, opposite the second photonic element 206 that is disposed on a second side of the flow channel 208. The photonic elements 204 and 206 can comprise at least one of a waveguide, splitter, combiner, mixer, interferometer, or the like.

A second silicon-based layer 210 can be disposed on the photonic elements and the flow channel 208. In one embodiment, the second silicon-based layer 210 serves as a capping layer. The second silicon-based layer 210 can comprise silicon oxide, silicon nitrite, or any other silicon-based insulator. In the illustrated embodiment, the second silicon-based layer 210 is disposed on the first photonic element 204, the flow channel 208, and the second photonic element 206.

Figure 3:
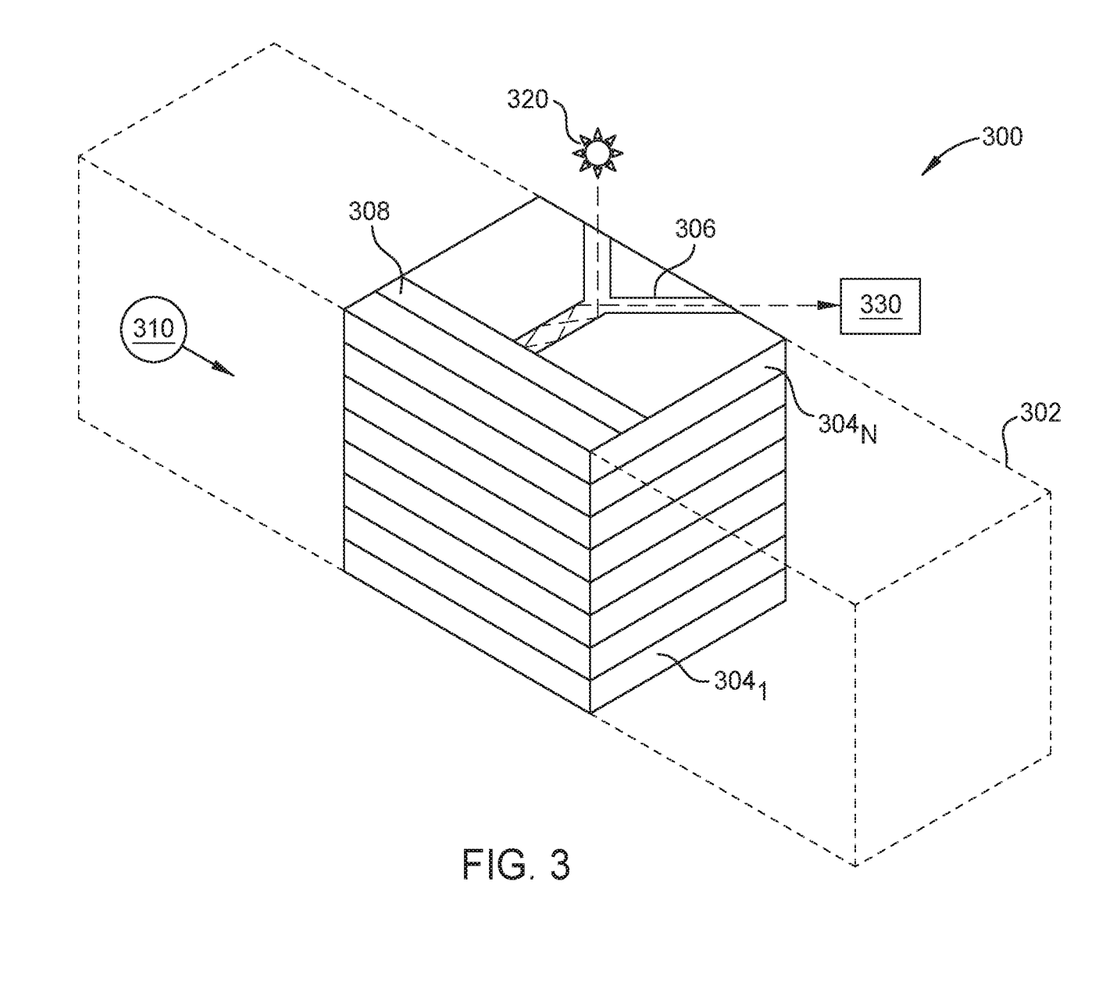
FIG. 3 illustrates a fluidic device measurement system with a multi-stack scalable flow unit, according to one embodiment.

FIG. 3 illustrates a fluidic device measurement system 300 with a multi-stack scalable flow unit $304_{1-N}$, according to one embodiment. In one embodiment, the multi-stack scalable flow unit $304_{1-N}$ can be disposed on or within a channel 302 of fluidic device.

The multi-stack scalable flow unit $304_{1-N}$ comprises at least one scalable flow unit disposed on a first scalable flow unit $304_1$. In the illustrated embodiment, a scalable flow unit $304_N$ is positioned at the top of the multi-stack scalable flow unit $304_{1-N}$. The scalable flow unit $304_N$ can include a photonic element 306 disposed on a flow channel 308. The photonic element 306 is depicted as a Y-splitter.

Further, as shown, the fluidic device measurement system 300 can include a light source 320 disposed on a first end of the photonic element 306, and a measurement device 330 disposed on a second end of the photonic element 306. The light source 320 and the measurement device 330 can be disposed on the same side of the scalable flow unit $304_N$.

In one embodiment, the light source 320 and measurement device 330 are operable to service all scalable flow units of the multi-stack scalable flow unit $304_{1-N}$. In another embodiment, the light source 320 and measurement device 330 are operable to service only scalable the scalable flow units $304_N$.

In one embodiment, the fluidic device includes a fluid with a set tracers 310 suspended therein. When the fluid travels across the channel 302 of the fluidic device, the fluid also travels across the flow channel 308 of the scalable flow unit $304_N$.

In the illustrated embodiment, the light source 320 can generate a light signal that propagates through the photonic element 306 from first end of the photonic element 306 to the flow channel 308. When the light signal reaches the flow channel 308, the light signal can encounter the tracers 310. During this encounter, the light signal may be partially absorbed, reflected, or refracted by the tracers 310. The light signal may also trigger a fluorescent effect in the tracers 310. The light signal can then propagate towards the second end of the photonic element 306, and reach the measurement device 330. The measurement device 330 can measure the light signal, and determine flow properties of the fluid.

One benefit of using a multi-stack scalable flow unit is increased accuracy and time saved in determining flow properties of a fluidic device. The multi-stack scalable flow unit enables light signal measurements to be taken at each scalable flow unit of the multi-stack scalable flow unit, thereby enabling parallel collection of data that is used to determine the flow properties.

Figure 4:
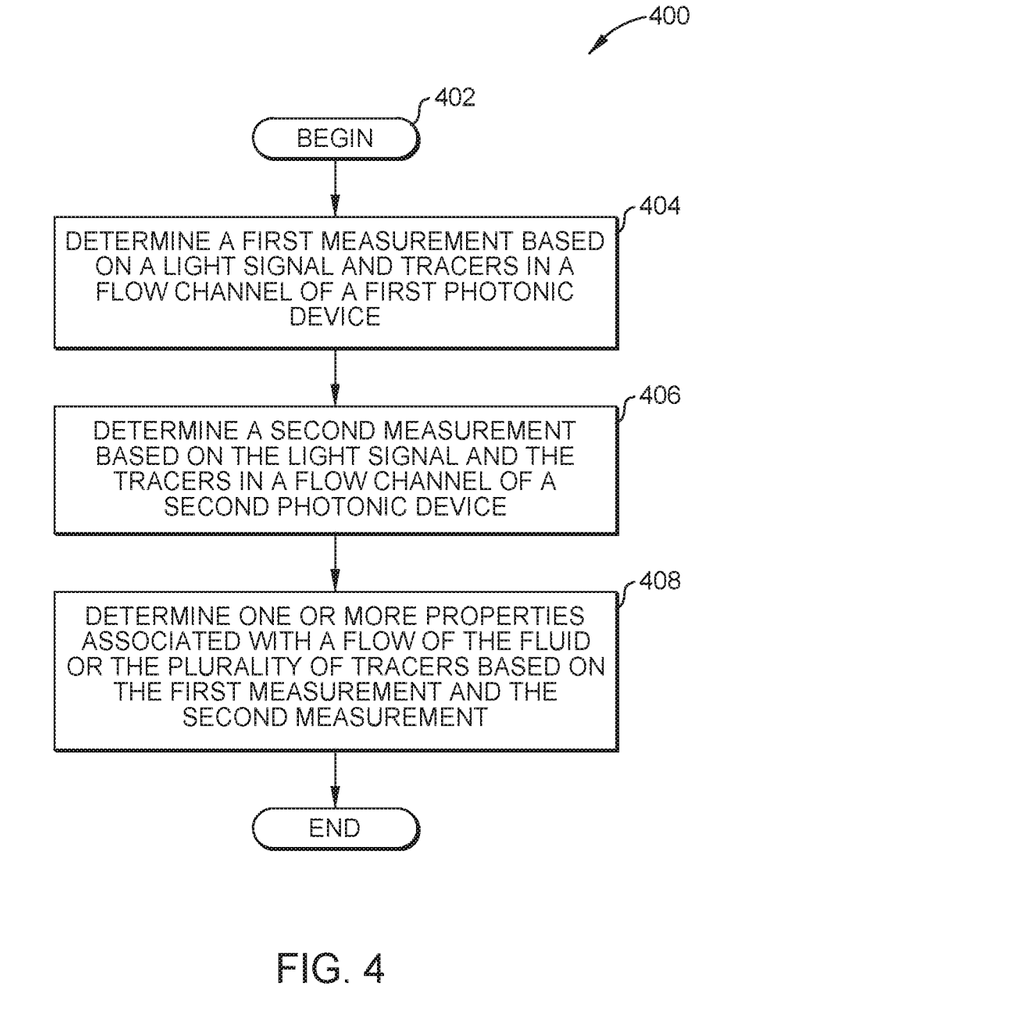
FIG. 4 illustrates a method of determining flow properties of a fluidic device, according to one embodiment.

FIG. 4 illustrates a method 400 of determining flow properties of a fluidic device, according to one embodiment. In one embodiment, the method 400 involves the control of a fluidic device measurement system. The fluidic device measurement system can comprise light sources configured to generate light signals, tracers suspended in a fluid of the fluidic device, one or more photonic devices, each comprising at least one photonic element and a flow channel, and measurement devices. In one embodiment, the photonic elements of a first photonic device can be aligned with the light sources to allow the light signals to reach the flow channel of the first photonic device via the photonic elements of the first photonic device.

The photonic devices can be disposed on or within a channel of the fluidic device. In one embodiment, the fluid of the fluidic device flows in the channel due to a pressure gradient applied to the device. The fluid can also flow through the flow channels of the photonic devices on or within the channel.

The method 400 begins at block 402. At block 404, measurement devices determine a first measurement based on the light signals and the tracers at the flow channel of the first photonic device. Referring to FIG. 1, in one embodiment, the photonic elements of the first photonic device (not shown) are aligned with light source 120B, which allows light signals from light source 120B to reach the flow channel of the first photonic device. The tracers 110 encounter the light signal from light source 120B as the tracers 110 travel along the flow channel of the first photonic device. During this encounter, the measurement device 130B can measure a fluorescence of the tracers 110; an absorption, reflection, or refraction of the light signal; or any change in intensity of the light signal. In one embodiment, the measurement device 130B can determine a point in time when it measures a light intensity or a change in light intensity from the tracers 110, and communicate the point in time with a computing system or with another measurement device.

At block 406, the measurement devices determine a second measurement based on the light signals and the tracers at a flow channel of a second photonic device. In one embodiment, the second photonic device is disposed on or within the fluidic channel at a different location than the first photonic device.

Referring to FIG. 1, in one embodiment, the photonic elements of the second photonic device (not shown) are aligned with light source 120C, which allows light signals from light source 120C to reach the flow channel of the second photonic device. The tracers 110 can encounter the light signals from light source 120C as the tracers 110 travel along the flow channel of the second photonic device. During this encounter, the measurement device 130C can measure a fluorescence of the tracers 110; an absorption, reflection, or refraction of the light signal; or any change in intensity of the light signal. In one embodiment, the measurement device 130C can determine a point in time when it measures a light intensity or a change in light intensity from the tracers 110, and communicate the point in time with a computing system or with another measurement device. In one embodiment, measurements can be taken at additional scalable flow units using a similar process to the foregoing.

At block 408, the measurement devices determine properties associated with a flow of the fluid or the tracers based on the first measurement and the second measurement. In one embodiment, the computing system receives the measurements and points in time, and determines an average time of flight ($<T_F>$) between the points in time. Hence, $<T_F>$ can represent the average amount of time the tracers take to travel from the location of the first photonic device to the location of the second photonic device. The distance between the locations of the first and second photonic devices can be represented as length L.

In one embodiment, the computing system or the measurement devices receives the measurements and the points in time, and determines an average time delay ($<\Delta t>$) between the points in time. For instance, $<\Delta t>$ can represent the average amount of time the tracers take to travel from the location of the second photonic device to the location of a third photonic device. The distance between the locations of the second and third photonic devices can be represented as $\Delta x$.

The flow rate (Q) of the fluid over the cross-sectional area (A) of the fluidic device is due to the applied pressure gradient ($\nabla P$). Given the aforementioned information, measurements, points in time, $\Delta t$, and $T_F$, the macroscopic flow speed (U) of the fluid in the fluidic device can be determined as follows:

$$U = Q/A = \Delta x / \langle \Delta t \rangle = L / \langle T_F \rangle$$

Additional flow properties can be determined given a measured or observed viscosity of the fluid ($\mu$), and macroscopic flow speed (U). Given the aforementioned elements, the permeability ($\kappa$) of the second channel configuration can be determined as follows:

$$\kappa = \mu U / (-\nabla P)$$

The method 400 ends at block 410. One benefit of the method 400 disclosed herein is the ability to determine flow properties of a fluid in a fluid channel, irrespective of differences between configurations of the fluidic channel. For example, referring to FIG. 1, measurements can be taken at scalable flow units positioned outside of the second channel configuration 106 (which includes the porous region) to determine the flow properties inside of the second channel configuration 106. This is particularly useful when a channel configuration is visually inaccessible (e.g., the channel configuration is opaque or otherwise obscured).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system comprising:
a light source configured to generate a plurality of optical signals;
tracers suspended in a fluid;
a plurality of photonic devices, each including a photonic element and flow channel; and
a measurement device configured to:
determine a first measurement based on the plurality of optical signals and the tracers in a flow channel of a first photonic device of the plurality of photonic devices,
determine a second measurement based on the plurality of optical signals and the tracers in a flow channel of a second photonic device of the plurality of photonic devices, and
determine a property associated with a flow of the fluid or the tracers based on the first measurement and the second measurement.

2. The system of claim 1, wherein a photonic element of the first photonic device is aligned with the light source to allow the plurality of optical signals to reach the flow channel of the first photonic device.

3. The system of claim 1, wherein a photonic element of the first photonic device comprises at least one of a waveguide, a splitter, a combiner, a mixer, or an interferometer.

4. The system of claim 1, wherein a first photonic element of the first photonic device and a second photonic element of the first photonic device are aligned on opposite sides of the flow channel of the first photonic device such that the plurality of optical signals can transfer from the first photonic element to the second photonic element.

5. The system of claim 1, wherein the photonic element of the first photonic device comprises a Y-splitter, wherein the light source is disposed on a first end of the Y-splitter, wherein the measurement device is disposed on a second end of the Y-splitter, and wherein a third end of the Y-splitter is disposed on the flow channel of the first photonic device.

6. The system of claim 1, wherein the flow channel of the first photonic device extends from one end of a first photonic device to the opposite end of the first photonic device.

7. The system of claim 1, wherein each of the first measurement and the second measurement comprises at least one of a fluorescence, reflection, a refraction, an absorption, or an emission of light.

8. The system of claim 1, wherein one or more photonic devices are disposed on the first photonic device.

9. The system of claim 1, wherein the tracers comprise at least one of polystyrene balls containing fluorescent molecules, inorganic particles, quantum dots, molecules, organic dye, metal micro-particles, or metal nanoparticles.

10. A photonic device comprising:
a substrate;
a first photonic element disposed on the substrate;
a flow channel disposed on the substrate and arranged to allow fluid, having a tracer suspended in the fluid, to flow in the flow channel, wherein the first photonic element is arranged to allow an optical signal and the tracer to reach the flow channel from outside of the photonic device; and
a capping layer disposed on the first photonic element and the flow channel.

11. The photonic device of claim 10, wherein the flow channel is arranged to allow the fluid to flow to a second photonic device, wherein the first photonic element is arranged to allow the optical signal and the tracer to reach the flow channel from outside of the photonic device such that (i) a measurement is determinable based on the optical signal and the tracer and (ii) a flow property associated with the fluid or the tracer is determinable based on the measurement, and wherein at least one of the measurement or the flow property is determinable via a measurement device.

12. The photonic device of claim 10, where the first photonic element comprises at least one of a waveguide, a splitter, a combiner, a mixer, or an interferometer.

13. The photonic device of claim 10, wherein the first photonic element and a second photonic element are aligned on opposite sides of the flow channel such that the optical signal can transfer from the first photonic element to the second photonic element.

14. The photonic device of claim 10, wherein the first photonic element comprises a Y-splitter, wherein a first end of the Y-splitter extends to a first side of the photonic device, wherein a second end of the Y-splitter extends to the first side of the photonic device, and wherein a third end of the Y-splitter is disposed on the flow channel.

15. The photonic device of claim 10, wherein the photonic device is disposed on at least one other photonic device.

16. A method comprising:
determining, via a measurement device, a first measurement based on a plurality of optical signals and based further on a flow of tracers when the tracers are disposed in a flow channel of a first photonic device;
determining, via the measurement device, a second measurement based on the plurality of optical signals and based further on the flow of the tracers when the tracers are disposed in a flow channel of a second photonic device, wherein the first and second flow channels are fluidically connected; and
determining, via the measurement device, a property associated with the flow of the tracers based on the first and second measurements.

17. The method of claim 16, wherein determining the property further comprises determining a macroscopic flow speed (U) of a fluid that includes the tracers.

18. The method of claim 17, wherein the macroscopic flow speed (U) is determined as a function of a flow rate (Q) of the fluid over a cross-sectional area (A) of the fluidic device, wherein Q is due to an applied pressure gradient (∇P), such that U=Q/A.

19. The method of claim 17, wherein the macroscopic flow speed (U) is determined as a function of a distance traveled (Δx) by the plurality of tracers and an average time ($<\Delta t>$) required to travel the distance Δx, wherein the macroscopic flow speed (U) is determined as a function of a channel length (L) traveled by the plurality of tracers and an average time of flight ($<T_F>$) required to travel the length L, such that $U=Q/A=\Delta x/<\Delta t>=L/(T_F)$.

20. The method of claim 17, wherein determining the flow property further comprises determining a permeability (κ) of a channel of the fluidic device based on a fluid viscosity (μ), the macroscopic flow speed (U), and a pressure gradient ∇P, such that κ=μU/(−∇P).

* * * * *